May 19, 1936.  P. O. BEESON  2,041,393
CORRUGATED LAMINATED SHEATHING
Filed May 15, 1934
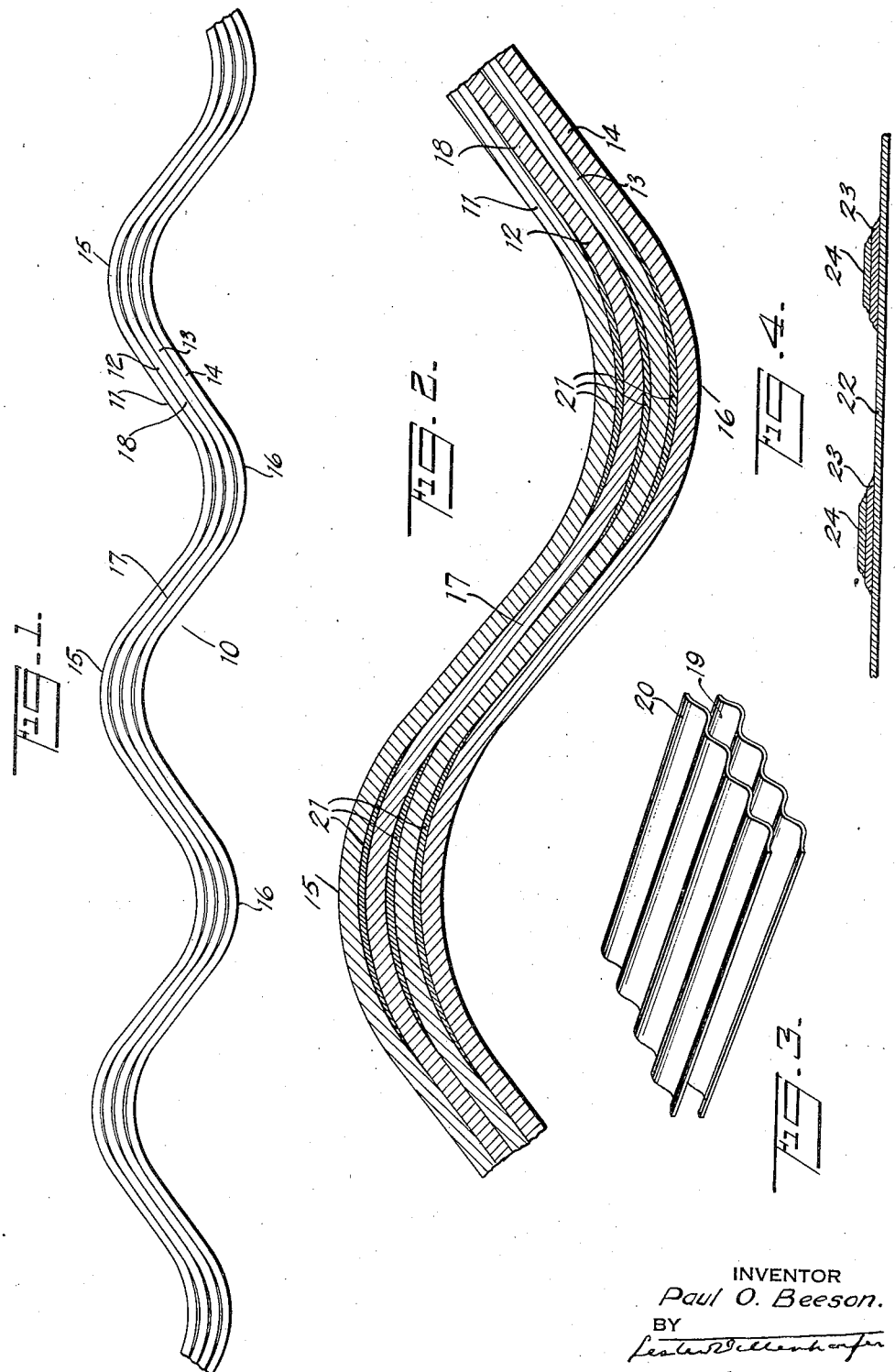
INVENTOR
Paul O. Beeson.
BY
ATTORNEY Patented May 19, 1936

2,041,393

UNITED STATES PATENT OFFICE 2,041,393

CORRUGATED LAMINATED SHEATHING

Paul O. Beeson, St. Louis, Mo., assignor to The Ruberoid Co., New York, N. Y., a corporation of New Jersey Application May 15, 1934, Serial No. 725,693

2 Claims. (Cl. 154—33)

The present invention relates to rigid, laminated and corrugated sheathings of the asbestos-cement type, adapted to be overlapped in the laying of roofs and sidings.

Sheathings of this type are so made that the inner and outer surfaces of the crests and troughs of the corrugations are of the same radii or contour, so that when two are overlapped, their crests and troughs fit snugly, and so that there is continuity of contact of all opposed surfacing. As an incident of such shaping, however, the sheathings have greater thickness at their crests and troughs than at the reaches between the same; and, heretofore such variation in thickness has resulted from a like variation in thickness of the laminations composing the sheathing.

An object of the present invention is to provide for the aforesaid variation in thickness of the sheathing, without necessity of provision for variation in thickness of the laminations.

In attaining this object of the invention, increments of the same mix as that of the component laminae, or of other suitable pulp or flexible material, are applied to the unset sheeting at areas therealong predetermined as to size and lay by the size and lay of the crests and troughs in the finished sheathing, and of aggregate thickness such that when windings or superposed layers of the sheeting are corrugated to form the sheathing, the excess thickness of sheathing at crests and troughs over that at the intermediate reaches will be represented and effected by the thickness of the increments.

When the sheathing is made by the so-called Hatschek process, the application of the increment material to the uncorrugated sheeting may be effected by any suitable mechanical means, such as by blocked-off cylinder molds over which the sheeting is passed before being wound.

Other objects and features of the invention will hereinafter appear in connection with the accompanying drawing, in which:—

Figure 1 is a side view of a portion of corrugated sheathing made in accordance with the present invention;

Fig. 2 is an enlarged view in longitudinal cross section of a portion of the sheathing of Fig. 1, of length to show one crest and an adjoining trough in the sheathing;

Fig. 3 is a view in perspective of two overlapped and closely fitting pieces of sheathing made in accordance with the present invention; and Fig. 4 is a side view of an unset and unmolded sheet of pulp, with spaced increments of like material thereon, formed in an early stage of the process, and which is ultimately to constitute one lamination of the finished sheathing.

Referring to the drawing, the sheathing 10 is shown as composed of four laminations 11, 12, 13, and 14; but it will be obvious that there may be any desired number of such laminations. It is corrugated to present crests 15 and troughs 16, of identical but reversed curvature, connected by reaches 17 and 18 which are preferably straight. The shaping of the sheathing sheets is such that when, as shown in Fig. 3, two identically formed sheets 19 and 20 are set and overlapped one upon another with crests and troughs in registry, they will snugly fit and contact with one another over all overlapping area.

Between the laminations at the crests and troughs are increments, preferably of the same material as that of which the laminations are composed. These increments in the finished sheathing, are shown as tapering, in crescent-like formation, at their sides, so as completely to fill all spacings between the laminations at the curved portions of the sheathing.

The preliminary sheeting is of a soft, or unset, pulpy mass of selected mix, such for instance as asbestos fibres in hydraulic cement, with or without other substances, and is made in any suitable manner, as by deposit upon a moving apron and by winding in rolls, according to the so-called Hatschek process. Such a sheeting is indicated at 22, in Fig. 4. The sheet 22 thus made, and before being rolled may have deposited thereon, preferably also as soft, unset pulpy masses, the material which is to form the increments 21 in the finished sheathing. Such deposits, shown at 23 of Fig. 4, are of the length of the sheet 22, and are of such area and thickness and so located on the sheet, that when the sheet is corrugated, they will constitute the increments 21 of the finished product, completely filling all spaces between the laminations at crests and troughs. The deposits 23 on the sheet 22 may conveniently be applied and accurately positioned by means of a blocked-off cylinder mold over which the sheet 22 is passed on its way to the accumulator or winding roll; and the deposits 23 will ordinarily, but not necessarily, be of the same composition as the sheet 22.

As shown in Fig. 2, the increments 21 are thickest at the peaks of the crests and troughs, and thence taper towards the straight reaches 17 and 18. These increments may consist of a single deposit 23 or of a plurality of deposits 23 and 24 of narrowing width as shown in Fig. 4. In this latter event, the thickness 23 may be applied, as heretofore suggested, by one blocked-off cylinder mold, and the thickness 24 of narrower width subsequently applied by another such cylinder mold.

In the manner aforesaid, and by suitably proportioning the deposits 23 and 24, the finished sheathing may be caused to have uniform density throughout, or may have any desired density at crests and troughs relative to its density at the straight reaches 17 and 18.

What I claim is:—

1. A process of making a corrugated asbestos-cement sheathing, consisting in producing flat sheets of the soft unset pulp, depositing on said sheets, at spaced areas thereof demarking the crests and troughs of the finished sheathing, increments of the pulp, superposing a plurality of layers of said increment-bearing unset sheeting with the increments in registry, and subjecting the assembly to corrugating pressure in such manner that the sheets become laminations of a sheathing in which the increments lie interposed between the laminations at the crests and troughs thereof and cause the inner and outer surfaces of the crests and troughs to have identity of contour, so that two such sheathings when overlapped will have continuity of contact.

2. A rigid, laminated, corrugated asbestos-cement sheathing, comprising superposed laminations having increments interposed between the laminations at the crests and troughs and which permanently unite the opposed laminations.

PAUL O. BEESON.